Sept. 14, 1965   E. J. BRETON   3,205,566
CORROSION-INHIBITED METAL-GLASS
Filed June 10, 1963   2 Sheets-Sheet 1

MICROSTRUCTURES OF
ALUMINUM-GLASS COMPOSITE, 150 ×

2 VOL %
GLASS

5 VOL %
GLASS

10 VOL %
GLASS

INVENTOR
ERNEST J. BRETON

BY *Harry J. McCauley*

ATTORNEY

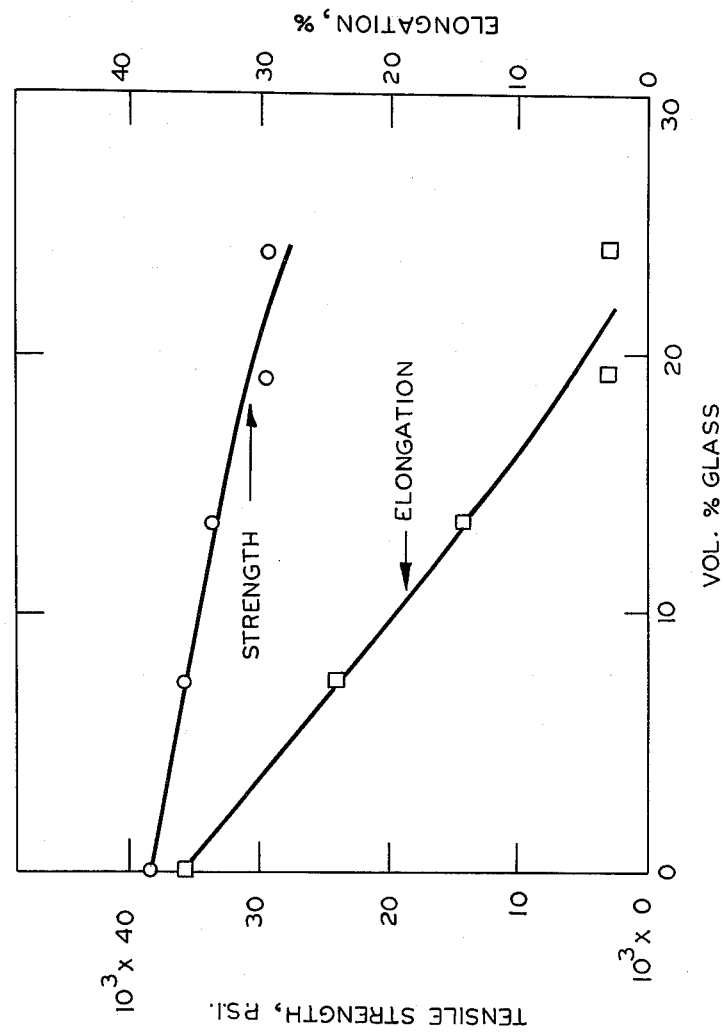

United States Patent Office 3,205,566
Patented Sept. 14, 1965

3,205,566
CORROSION-INHIBITED METAL-GLASS
Ernest J. Breton, West Grove, Pa., assignor to E. I. du Pont de Nemours and Company, Wilmington, Del., a corporation of Delaware
Filed June 10, 1963, Ser. No. 286,856
9 Claims. (Cl. 29—182.5)

This invention relates to corrosion-inhibited metal-glass compositions, and also to methods for their manufacture.

Producers and users of metals and alloys have expended great efforts and large sums of money to safeguard metals and alloys against corrosive attack and change in appearance as a result of protracted exposure to atmospheric weather and other destructive environments. However, there has hitherto been no very general solution to the problem and, besides, any protection such as that afforded by exterior coatings is usually temporary in nature and is also often objectionable, in that there is masking of the metal itself. The problem becomes more serious each year, because of growing scarcities of natural resources, the expense and inadequacy of surface restoration measures and other difficulties.

Figure 1:
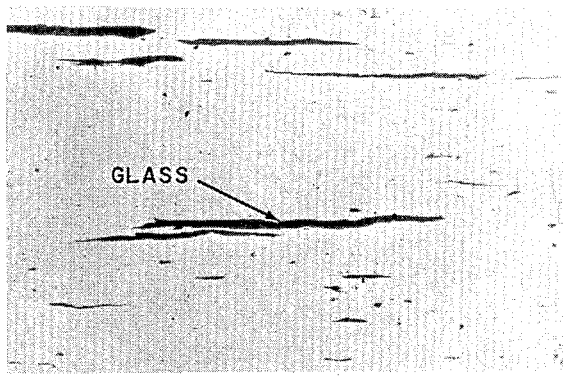
Figure 1:
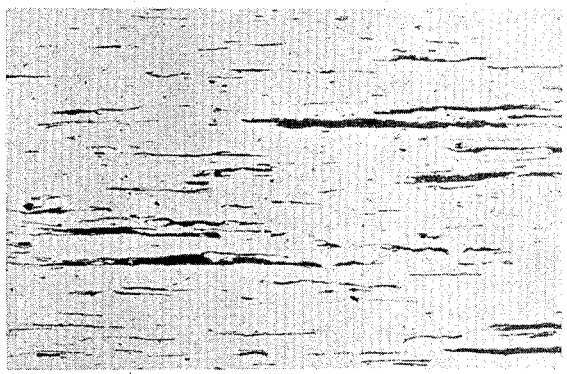
Figure 1:
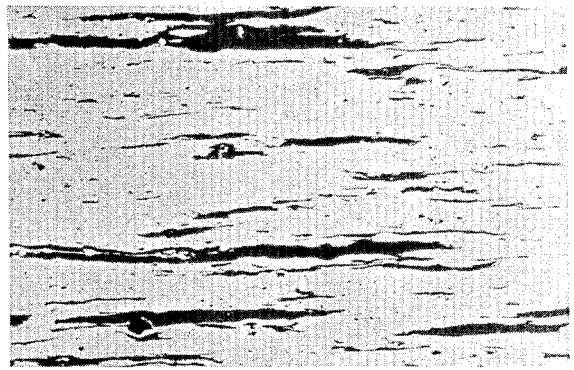

An object of this invention is to provide compositions which are primarily metallic in appearance and properties but which are inhibited against corrosion by intimate association with a moisture-leachable glass which, in the course of its slow dissolution, releases corrosion-inhibiting subtsances. Another object of this invention is the provision of methods of manufacturing the corrosion-inhibited compositions. The manner in which these and other objects of this invention are obtained will become apparent from the following detailed description and the drawings, in which:

FIG. 1 constitutes photomicrographs (150× magnification) of polished specimens and extruded Al-glass composites according to this invention containing, respectively, 2, 5 and 10 volume percent of glass, and FIG. 2 is a general plot of tensile strength and elongation characteristics versus volume percent glass for iron-glass composites fabricated as hereinafter taught.

Generally, this invention consists of a manufacture comprising a sintered metal-glass composite made up of an intimate mixture of powdered metal and a water-leachable ground glass having a softening point within ±100° C. of the sintering temperature of the metal, the glass releasing a corrosion inhibitor for the metal in the course of slow dissolution of the glass during exposure to the surrounding environment, together with the method of preparation of such materials.

The term "glass," as hereinafter referred to, is intended to include not only supercooled solid solutions conventionally thought of as glasses but also the porcelain enamels as well. Also, the term "metal" is intended to comprehend alloys, too, the invention being equally applicable to these.

The structure of my metal-glass composites can be of two general types depending upon whether products having essentially metallic properties are desired or whether colored composites as taught in U.S. application Ser No. 286,746, filed of even date herewith, now U.S. Patent No. 3,165,821, is the objective. In the former case a relatively low glass content, most often not exceeding 15 volume percent, is all that is necessary to achieve good corrosion resistance, whereas in the latter case the glass also serves the function of a colorant vehicle, so that glass contents as high as 70 volume percent may be necessary to achieve special esthetic effects.

Corrosion inhibition according to this invention is obtained by the intimate distribution of leachable glass adjacent all of the metal particles of the composites, the extent of this distribution for even low glass contents being evident from FIG. 1, which reveals the glass as non light-reflective, dark-colored stringers existing at quite uniform spacings throughout the Al metal matrix. Extrusion is one preferred method of densification of the composites, as hereinafter more fully described, and the specimens of FIG. 1 were all extruded at pressures of about 35,000 p.s.i. at temperatures of 580° C. and extrusion ratios of 16:1, producing the elongated stringers of glass shown for glass contents as low as 2 volume percent. Allowing for the 150× magnification, ½" on the photomicrographs (2¾" x 4¼" size) is equivalent to about 0.1 mm. of measured distance, which is an effective corrosion-inhibitory radius from any given leachable glass particle site, as verified by Example 3, infra. Consequently, any points beyond a 0.1 mm. radius from any given glass particle site must be protected by another site disposed no more than 0.1 mm. therefrom. It is clear from an examination of FIG. 1 that there is no region 1" in diameter for any of the glass contents shown which is not liberally provided with leachable glass particle sites protective of the adjacent metal.

The colored metal-glass composites of U.S. application Ser. No. 286,746, hereinbefore mentioned, contain much higher glass-metal ratios and, in fact, consist ideally of two fine, substantially continuous, intimately interlocked and probably interbonded as well, highly irregular matrices of metal and glass. Typically, the thickness of the metal within its matrix form is about 150 microns whereas an average thickness of the glass is about 250 microns, corresponding to a composition of 40 volume percent metal and 60 volume percent glass, so that metal and glass are in even closer adjacency here than where the objective is corrosion inhibition solely, as represented by the compositions of FIG. 1.

The functions of the glass component of my composites are multiple, in that, the glass constitutes a regulated release agent for corrosion-inhibition agents liberated therefrom by leaching, a protective coating for chemically reactive corrosion-inhibition agents distinct from the glass per se safeguarding against dissipation of these by reaction with the adjacent metal component, atmosphere or other surroundings and a metal-surface wetting medium insuring very intimate contact of corrosion-inhibiting substances with metal faces subject to corrosive attack. Yet another function of the glass is that it can be made to serve as a strong bond with metal and other surfaces to which it is desired to effect attachment of the corrosion-inhibited compositions as coatings. Very satisfactory corrosion-inhibition according to this invention can be obtained by the utilization of from about 5% to about 15% by volume of glass, depending on the severity of the exposure environment, so that high strength, machinability and natural metal appearance are preserved to a very high degree.

Two classes of glass which are especially well suited for the purposes are the silicate glasses and the phosphate glasses, the compositions of each of which can be quite readily adjusted to obtain a water-leachability insuring the release of specific corrosion-inhibition agents at predetermined rates. The necessary inhibitor rate of release which gives optimum results in a particular environment depends, of course, on the nature of the environment and also upon the specific inhibitor employed, the limits of 50 p.p.m. to 10,000 p.p.m. of inhibiting ions established by the following test being entirely satisfactory for most situations.

(1) A sample of the glass releasing inhibiting agents as a product of glass dissolution per se or by progressive exposure of additives charged into the glass is ground to U. S. Standard Sieve Size particles 100% through 100 mesh, 100% retained on 200 mesh.

(2) One part of loosely packed ground glass from (1) is mixed with 2 parts by volume distilled water.

(3) The ground glass and water are gently agitated for 4 hours at room temperature (20° C.) to reach equilibrium conditions.

(4) The water extract is filtered off and analyzed by conventional methods for presence of inhibiting or passivating ions.

The leachability of the glass can be adjusted by suitable modification of the composition, in that, for example, incorporation of the oxides $Na_2O$, $K_2O$ and $B_2O_3$ generally act to increase the water solubility, whereas the alkaline earth oxides CaO and BaO generally decrease the water solubility.

There exists a vast accumulation of knowledge as to specific substances which are effective as corrosion inhibitors for particular metals in at least generally described environments, some especially efficient examples being the silicates, chromates, tungstates, molybdates, nitrates nitrites, borates, ferrates and phosphates of the alkali and alkaline earth metals and Zn. The exact mechanism by which the corrosion inhibitors work is not known. However, it seems that they ionize to at least some degree in the presence of moisture and spread out over adjacent metal surfaces to protect the metal by anodic-inhibition, cathodic-inhibition metal passivation which protects the metal by physical shielding, metal passivation or as a result of practically immediately arrested continuation of corrosive attack in accordance with the principles of the law of mass action. In any case, a progressive low-rate replenishment on demand of ions such as the chromates tungstates, etc., hereinbefore mentioned, delivered straight to the localized metal sites, confers a very high order of corrosion inhibition, in many instances, as, for example, with Al, even protecting the exposed metal against change in surface appearance, pitting and the like.

In making up metal-glass composites according to this invention it is preferred to employ powders finer than about 100-mesh, commercial grades of powdered metals being generally satisfactory for the purposes. The powdered glasses can be custom-made to the required water lechability and, in fact, no satisfactory commercial glasses are known to exist.

The best mechanical properties in terms of both strength and mechinability are obtained by matching the softening point of the glass component within ±100° C., preferably with the glass softening temperature on the minus side with the commercial sintering temperature of the associated metal, provided the glass temperature remains below the metal melting point. Commercial sintering practice has shown that metals and alloys have practicable sintering temperature progressively lower than the actual metal melting points as one proceeds upward on the temperature scale, so that, whereas Zn, Mg and Al, and their alloys sinister relatively near their melting points, Cu can be sintered appreciable lower than its 1083° C. melting point, while Fe and higher melting metals and alloys can be successfully sintered at temperatures hundreds of degrees below the respective melting points. This is a fortunate circumstance from the standpoint of corrosion-inhibitor protection, because the tendency towards dissipation through chemical reaction with adjacent metal is thereby much reduced, making it possible to use a considerably larger number of substances for corrosion prevention than would otherwise be possible.

The corrosion inhibitors employed as additives in supplementation of the corrosion inhibitory effect contributed by the products if dissolution of the glass per se, particularly those soluble in the glass, are charged into the glass batch by admixture therewith and thereafter smelted at temperatures of typically 900° C. for 60 minutes, stirring until a clear, bubble-free solution is obtained, whereupon the molten product is quenched to a frit by pouring into cold water. The frit is then dried and ball-milled to again reduce its size to below about 100-mesh. Some inhibitor additives, such as the tungstates and molybdates, are only slightly soluble in glass and, accordingly, there is reduced advantage in adding them directly to the glass batch to effect their incorporation into the glass, although a measure of physical occlusion is thereby obtained, which can be positively advantageous in certain circumstances. In such instances, intimate mixing of the ground glass and the powdered corrosion-inhibitor just before manufacture of composites is often satisfactory. The charged frits are stable to storage and thus need not be used in the freshly prepared state.

It is preferred to incorporate the corrosion-inhibitor thoroughly with the glass prior to addition of the metal because the protective role of the glass is thereby usually facilitated; however, this is not essential where relatively nonreactive inhibitors are employed.

The charged frit and powdered metal are batch dry-mixed together in the desired proportions (e.g., 5–15% by volume of glass to metal) for typically 15 minutes, after which the mixture is cold-pressed at about 60 tons/sq. in., or considerably less for Al and other soft metals or their alloys, to obtain a green compact of about 90% theoretical density which is thereafter sintered according to commercial practice. For Al, heating to temperatures of 500–550° C. for 45 minutes has proved adequate, whereas Fe composites can require temperatures as high as 800–1100° C. for equivalent times. The use of appropriate protective atmospheres to shield the product against oxidation of the metal component as well as deterioration of corrosion-inhibitors is often advantageous, or the use of strippable hermetically sealed cans for this purpose is also practicable. Mechanical properties are improved by densification procedures conducted on the hot sintered composite, including forging, rolling, extrusion and other severe manipulations, in the course of which the final-shaped objects can be fabricated.

The importance of leachability as an operative corrosion-inhibition mechanism according to this invention is demonstrated by the following comparative test in which the exposure was to a 100% relative humidity air atmosphere at a temperature of 180° F. for 16 hours, under which conditions water condensed continuously on the samples.

The metal-glass composite sample, denoted A, was made up by dry-mixing in a ball mill 85 parts by volume of Fe powder with 15 parts by volume of ground glass powder (each of particle size 100% through 100 mesh, 100% retained on 400 mesh), pressing at 60 tons/sq. in. and sintering at 850° C. for 4 hours. The glass had the analysis (weight percent): 39.0 $SiO_2$, 24.0 $K_2O+Na_2O$, 18.0 $B_2O_3$, 2.0 $Al_2O_3$, 5.0 $CaF_2$, 8.3 PbO and 3.7 $CrO_3$. When tested for leachability as hereinbefore described, the results were $(SiO_3)^=$ 915 p.p.m. and $(CrO_4)^=$ 825 p.p.m.

A second metal-glass composite sample, denoted B, was made up in all respects identical with A, except that the glass utilized was a typical insoluble commercial soda lime silciate window glass, analyzing, in weight percent, 72.7 $SiO_2$, 13.25 $Na_2O$, 1.06 $Al_2O_3$ and 13.0 CaO, which displayed a leachability value of only 40 p.p.m. $(SiO_3)^=$.

As a control, a strip of conventional cold-rolled SAE 1020 steel, having zero water extraction value under the leachability test, was included in the test.

The difference in performance was dramatically evident visually, Sample A displaying only a few minor pits, whereas Sample B was liberally spotted with both large and small pits over about 70% of its area. The steel control was extremely heavily corroded over its entire expanse, so that, on a linear scale relative basis, if Sample A were rated 1, Sample B would fall between 5 and 6 and the steel sample would then lie at 10 to 12.

From the foregoing, it is apparent that leachability is a critical factor in the successful practice of this invention. The commercially available glasses are so insoluble as to be ineffective for the purposes, and the following four specific varieties failed the leachability test also, so that these, too, are unsuitable:

| Glass type: | P.p.m. ($SiO_3$)= |
|---|---|
| Pyrex | <20 |
| Commercial bottle glass | 50 |
| Pemco S-918 steel enamel | 42 |
| Du Pont L-388 enamel | <20 |

The comparative efficacy of corrosion inhibition according to this invention as opposed to typical commercially available competitive materials of construction, such as iron, mild steel and wrought iron, is demonstrated by the following prolonged exposure test. The test consisted of continuous exposure of all samples for 20 full days in air of 100% relative humidity maintained at a temperature of 50° C. The specimens were suspended vertically from polymeric hooks and their respective abilities to withstand corrosion are tabulated in reverse order from most-corrodible to least-corrodible, i.e., in ascending order-of-merit rank.

All metal-glass composite samples were made by sintering minus 100 mesh iron powder in the proportion of 85 parts by volume Fe to 15 parts by volume of the same general specification of the specific glass powders having the compositions denoted adjacent each specimen, cold pressing at 60 tons/sq. in. to form a green compact and sintering at 850° C. for 4 hours. Sample No. 8, denoted "Chromate Glass," was made up with glass of the same composition as Sample No. 5, except that 3–4% by weight of $K_2CrO_4$ was added thereto to obtain the benefit of chromate ion additional inhibition. Similarly, Sample No. 9, denoted "Tungstate Glass," contained glass of the Sample No. 5 composition, except with 3–4% by weight of $K_2WO_4$ added to test the additive advantage of tungstate ion.

*Example 1*

CONTROLS

| No. | Sample | Quality sequence | Observation |
|---|---|---|---|
| 1 | SAE 1020 Steel | 8 | 60% obscured with large rust spots, balance 70% obscured. Worst sample of group. |
| 2 | Iron bar (high purity Fe with less than 1% C; no working). | 7 | 60% of surface obscured with large rust spots, balance 50% spotted. |
| 3 | Wrought iron (percent analysis: C 0.02, Mn 0.16, Si 0.13, P 0.13, S 0.01, slag 2.5, bal. Fe). | 6 | 40% obscured, balance spotty but more open than Sample No. 2. |

SAMPLES ACCORDING TO INVENTION

| No. | Sample | Quality sequence | Observation |
|---|---|---|---|
| 4 | Lime glass, least soluble (100 $SiO_2$, 40 $Na_2O$, 20 CaO). | 5b | 10% with large rust spots, balance with fine spots. |
| 5 | Borosilicate glass (100 $SiO_2$, 50 $B_2O_3$, 17 $Na_2O$). | 5a | Appearance about the same as Sample No. 4. |
| 6 | Lime glass, less soluble (100 $SiO_2$, 40 $Na_2O$, 10 CaO). | 4 | Several large rust spots plus fine peppering. |
| 7 | Lime glass, most soluble (100 $SiO_2$, 40 $Na_2O$, 5 CaO). | 3 | No large rust spots but a fine peppering of tiny spots. |
| 8 | Chromate glass | 2 | End zones 15% stained, balance like Sample No. 7. |
| 9 | Tungstate glass | 1 | 5% stain at one end, plus fine spots like Sample No. 7 over balance. This was the best of the group. |

This example confirms the fact that glasses high in alkali are more soluble than those high in alkaline earth, and the latter are yet more soluble than those high in elements such as iron, which form the principal metallic silicates found in wrought iron. The importance of leachability, accompanied by the release of glass phase dissolution products of corrosion inhibitory value together with the progressive unloading of any charged additives having inhibitory value in themselves, is clearly evident from the data. In general, while the control samples were very badly rusted and stained, all of the samples of the invention were only slightly affected, as by fine peppering, for example, coupled with slight staining at their ends where condensed water collected throughout the lengthy test exposure.

*Example 2*

In this case it was desired to obtain a characteristic surface finish on an aluminum metal-glass composite, while still conferring corrosion resistance to salt spray. Accordingly, glass contents in higher percentage than those necessary for corrosion resistance solely were utilized, namely, 25 volume percent and 41 volume percent, respectively, which were tested for each glass concentration in both etched and unetched condition (etchant 2% aqueous NaOH solution), the unetched samples in general retaining a soft satiny metallic luster whereas etching converted the appearance to a flat, matte, stone-like surface finish, all as described in cofiled U.S. application Ser. No. 286,746, supra.

Two low-melting glasses were used in the several compositions, both of which contained the same amounts of chromate and silica, except that glass D contained nearly 50% more Na and correspondingly less $TiO_2$ than glass C in order to increase the former's solubility.

*Mol percent*

| Glass | PbO | $SiO_2$ | $Li_2O$ | $Na_2O$ | $K_2O$ | $TiO_2$ | $Sb_2O_5$ | $CrO_3$ |
|---|---|---|---|---|---|---|---|---|
| C | 13.3 | 39.2 | 6.4 | 19.0 | 2.0 | 14.5 | 0.78 | 4.8 |
| D | 13.6 | 39.2 | 6.5 | 27.5 |  | 7.4 | 0.79 | 4.9 |

The sintered metal-glass composites were prepared by mixing 100 mesh size Al with the specific ground glass employed (particle size 100% through 100 mesh), cold compacting at 40,000 p.s.i. pressure and thereafter sintering by heating for 1 hour at 540° C., following which the thickness was then reduced from 1″ to about 0.4″ by hot forging.

Control samples of commercial aluminum, grade 2S, and "Alclad," which is 2024S Al alloy clad on both sides with pure aluminum, were prepared for comparative purposes and all samples exposed at a constant 95° F. temperature for 600 hours to a salt spray consisting of 5% NaCl in water.

The results were as follows:

| Controls | Quality sequence | Observations |
|---|---|---|
| Aluminum 2S | Both 5 | Both samples covered with irregular, patchy, light-brown stain, pitted, and white corrosion products (probably $Al(OH)_3$) showing. |
| "Alclad" | | |
| Invention samples: | | |
| 41 volume percent Glass C, no etch. | 4 | Increased matte, slightly brownish hue. |
| 41 volume percent Glass C, etched. | | Slight white corrosion product spotting. |
| 25 volume percent Glass C, no etch. | 3 | Slightly increased matte |
| 25 volume percent Glass C, etched. | | Essentially unchanged. |
| 41 volume percent Glass D, no etch. | 2 | Slight white corrosion product spotting. |
| 41 volume percent Glass D, etched. | | Slightly increased matte. |
| 25 volume percent Glass D, no etch. | 1 | Essentially unchanged. |
| 25 volume percent Glass D, etched. | | |

The conclusions drawn from this test were that, even though the salt spray might have attacked the unetched samples to some degree, the result with even the least-soluble glass was largely confined to some matte development which, in most instances, is quite unobjectionable and even somewhat decorative. However, glass of increased leachability, such as analysis D, was still superior over glass C in corrosion protective capability, especially where original surface appearance retention is desired.

*Example 3*

This experiment was devised to verify the process of inhibition by which the invention operates.

A round ½" diameter low-carbon steel (SAE 1020) rod was provided with a concentric 1/16" diameter blind hole in the end, drilled to ½" depth, which was filled with a slightly leachable compacted chromate-containing glass having the composition of Glass D, Example 2. The glass was fused in place by heating the rod, in upright position, to 600° C. and the end thereafter polished to provide a smooth metal-glass surface as a test area.

When the specimen was submerged in water for 24 hours, metal within 1 mm. distance from the glass displayed no visible corrosion, although the balance of the metal rusted severely. Clearly, the glass was effective in maintaining a sufficient concentration of inhibiting ions throughout a 1 mm. peripheral metal annulus to prevent any corrosion therein.

*Example 4*

It is well known that ferrous metals, even when protected by an enamel coating, remain very vulnerable to corrosion at any points where the enamel coating might become pierced. It was conceived that metal-glass composites inhibited against corrosion would be useful as protective undercoats for enamels of the type employed on steel, provided the enamel-undercoat bond was sufficiently strong to withstand impacts of the type encountered during the service life of such materials.

Accordingly, an Fe—15 volume percent glass (composition in weight percent $Na_2O$ 19.9, $B_2O_3$ 13.8, $Al_2O_3$ 6.9, $SiO_2$ 49.4, $CaF_2$ 7.5, CoO 0.6 and MnO 1.0) composite was made up using minus 100 mesh powders of each. These were pressed into billets measuring 3" x 5" x ¾" at a pressure of 40 tons/sq. in. and sintered for 18 hours at 880° C. in a mixture of 90% argon plus 10% hydrogen. The specimens were then hot-forged until the thickness was reduced to 1/16".

A commercially available porcelain enamel steel, namely, "Ti-Namel," a product of Inland Steel Co., Chicago, Illinois, which incorporated metallic Ti as a protection against carbon loss from the steel in the form of troublesome CO bubbles, was used as a comparative standard and this, together with the composite samples, was sanded with 200-grit paper and coated with a slurry of ground coat enamel for steel. After drying, all samples were fired for 5 minutes at 830° C.

In a standard drop test to determine the respective adhesions of enamel to base metal, a one-pound ball was used to impart the impact shock, and the control failed at 7 in.-lbs., as compared to the metal-glass composite, which successfully withstood 12 in.-lbs. Moreover, even in failure, the enamel at the point of impact of the latter cracked but did not spall, whereas the enamel on the control spalled off as far as one inch from the impact point, demonstrating the difinite superiority of metal-glass composites for the use contemplated.

*Example 5*

Aluminum-glass composites made up from Al powder plus 20% glass as hereinbefore described for Example 2, compacted at 35,000 p.s.i. before sintering, displayed good mechanical strength properties, demonstrating workabilities to a degree permitting the shaping of intricate forms by commercial practices of the art.

Thus, even with the relatively high glass content of 20%, a specimen extruded at 580° C. with a 16/1 extrusion ratio showed a tensile strength of 23,000 p.s.i. together with an elongation of 4.5%.

The variation of tensile strength and elongation with percent glass content is graphically shown in FIG. 2 for Fe-glass composites throughout the entire range in which corrosion inhibition protection is the primary interest (as distinguished from superadded color or surface effect impartation as hereinbefore mentioned).

*Example 6*

This example was devised to determine the corrosion-inhibiting efficacy of phosphate glasses per se, i.e., without inclusion of any additives, so that any inhibition obtained resulted solely from dissolution products released by the glass as a result of leaching.

In this instance a commercially available powdered spronge iron was utilized, the analysis in weight percent being: 96.5 Fe, 0.3 C, 0.05 S, 0.015 P, with the balance presumed to be iron oxides, since no $SiO_2$ was present. The screen analysis was: trace retained on 100 mesh, 10% on 200 mesh, 15% on 325 mesh and 75% finer than 325. The ground glass utilized was finer than 100 mesh and analyzed, in weight percent: 24 $Al_2O_3$, 23.8 Al $(PO_3)_3$, 9.7 $TiO_2$, 12.0 $B_2O_3$ and 30.6 $Na_2O$. The leachability value of this glass was 4000 p.p.m. $(PO_4)^{\equiv}$. The ratios of iron to glass were proportioned to yield composites containing, respectively, 5, 10 and 15 weight percent glass. In all instances the powders were intimately mixed together, cold-pressed at 40,000 p.s.i. heated to 870° C. in $H_2$ and hot-forged. The composite samples were then sanded with 240 grit paper.

The corrosion test was accomplished by placing the samples at a 10–15° slant to the vertical in the upper part of a desiccator containing water in the lower portion. Heat was then applied to the bottom to evaporate water, which thereupon passed as vapor to the sample region, condensing on the samples and dripping back to the water bath. The temperature in the upper chamber 75° C. The test extended for 720 continuous hours, after which the samples were removed and examined for corrosion.

| Sample identity | Corrosion at top where crevice existed with respect to desiccator wall (i.e., in regions where water was entrapped) | Pitting corrosion | General corrosion |
| --- | --- | --- | --- |
| 100% Fe control | Heavy | Scattered on edges. | 85%. |
| 5% Glass<br>95% Fe | }Moderate | Slight | 20%. |
| 10% Glass<br>90% Fe | }None | None | Very faint. |
| 15% Glass<br>85% Fe | }----do | Scattered | 20%—White corrosion products (probably ferrous phosphate). |

It is clear that a decided improvement in corrosion resistance resulted from the utilization of this invention. Somewhat surprisingly, the sample with 10% glass content out-performed the 15% glass sample. This was due to the fact that superior mechanical properties of iron-glass products exist at the lower glass contents and this resulted in an overall betterment based on optimum metal-glass proportioning.

The good resistance of the composites to crevice corrosion is particularly significant, since it is this characteristic which can be expected to yield maximum advantage in paint and ceramic undercoat service as well as in recessed structures such as the threads of bolts and the like.

*Example 7*

This example was devised to test the efficacy of corrosion inhibition additive inclusion in phosphate-type glasses such as those reported in Example 6.

Three different analyses of glasses were prepared by heating at 1000° C. and allowing to cool without fritting, these being (in weight percent) glasses E, F and G as follows:

|  | E | F | G |
|---|---|---|---|
| $K_2CrO_4$ |  |  | 10.0 |
| $ZnCrO_4$ |  | 10.0 |  |
| $B_2O_3$ | 12.0 | 10.9 | 10.9 |
| $Na_2O$ | 30.6 | 27.8 | 27.8 |
| $TiO_2$ | 9.7 | 8.8 | 8.8 |
| $Al(PO_3)_3$ | 23.8 | 21.7 | 21.7 |
| $Al_2O_3$ | 24.0 | 21.8 | 21.8 |
| Leachability values, p.p.m.: |  |  |  |
| $(PO_4)^{\equiv}$ion | 4,000 | 9,600 | 10,600 |
| $(CrO_4)^{=}$ion | None | 340 | 8,800 |

The glasses were individually ground to a fineness passing a 200 mesh screen and mixed in the proportion of 10% by volume with sponge iron identical with that described for Example 6. The iron-glass mixtures were then cold-pressed at 100,000 lbs./sq. in. into billets measuring 2″ x 1½″ x ¾″. These billets were heated at 880° C. for 20 minutes in a $H_2$ atmosphere and then hot-forged. Each of the resulting composites was ground with 120 grit paper and rinsed in acetone to remove surface contaminants.

The specimens were individually tested by standing each upright in a separate beaker of tap water for 20 hours, with the water level carried about half-length of the samples, thereby maintaining an air-water interface especially vulnerable to corrosive attack. A control sample of sintered sponge iron without any included glass was subjected to the same test for comparative purposes.

Sample E revealed corrosion in the form of three well-defined rust striations in the upper region, i.e., above the water level. Sample F showed somewhat the same type of attack as E, except that the striations were more generally distributed. Sample G was free of all visible signs of corrosion and retained its original appearance unaffected. The control sample was rusted very heavily throughout the entire above-water expanse.

The relative inferiority of Sample F over either E or G is believed due to the relative insolubility of $ZnCrO_4$ as compared with $K_2CrO_4$, which is evident from the comparative leachability test standings. It would seem that, in this particular test, and with the specific glass compositions involved, relatively high $(PO_4)^{\equiv}$ ion release solely was not enough to insure corrosion protection, but that $(CrO_4)^{=}$ in relatively high amounts, simultaneously released, was decidedly beneficial.

This invention is especially effective for use with the corrosion-prone low-carbon steels, such as SAE 1018 and 1020. Typical zinc alloys which can be used as the metal component include ASTM types XXIII and XXV. Typical magnesium alloys are ASTM types AZ61A–F and AZ80A–T5. The use of other metals, such as copper, is equally feasible but, since the commercial materials possess rather good resistance to atmospheric corrosion anyway, the possibilities of improvement in this regard are correspondingly less.

There occurs no perceptible physical weakening of composites fabricated according to this invention as a result of leaching occurring in corrosive environments, it being understood that this is a slow-rate phenomenon, and probably one progressively diminished according to mass-action law by occlusion of inhibitor ion-rich solutions within the sintered composite pores as exposure proceeds.

My composites, due to their excellent metal and glass bonding capabilities, afford the means for obtaining multi-layered structures ranging from metal at the one extreme to essentially pure glass at the other, the intervening space being filled with gradations of metal-glass composites glass-enriched progressively from the metal side through to the glass side and with a wide variety of built-in corrosion inhibition properties to suit particular environmental demands.

Moreover, the most convenient and preferred fabrication techniques of the arts lend themselves to use in the preparation, consolidation and finish forming of the products, ranging from the use of induction heating for the rapid uniform heating of the green compacts to high ratio extrusions in the final processing of the composites.

The use of this invention concurrently with the preparation of colored metal-glass composites as taught in co-filed U.S. application Ser. No. 286,746, hereinbefore referred to is entirely effective in imparting enhanced corrosion resistance to the colored composites. Indeed, in some instances the roles of colorant and corrosion inhibitor overlap, as is the case where chromates are employed as coloring agents for the glass component, permitting the use of only a single substance for both functions, subject, of course, to the requirement that there be satisfactory passage of the leachability test hereinbefore described.

"Sintering temperature," as the term is herein employed, is that temperature customarily used in commercial sintering practice, and can be anywhere from about 67% to about 95% of the melting point of the specific metal involved, coincidence with melting temperature being closest with the lower-melting metals and progressively less as one proceeds to the higher melting point metals and alloys.

From the foregoing, it will be understood that this invention is capable of relatively wide modification within the skill of the art without departure from its essential spirit, and it is therefore intended to be limited only within the scope of the appended claims.

What is claimed is:

1. A manufacture of improved corrosion resistance comprising a sintered metal-glass composite wherein adjacent sites of said glass within said metal are separated at spacings not exceeding about 0.1 mm. made up of an intimate mixture of powdered metal and ground glass having a softening point within about ±100° C. of the sintering temperature of said metal, but below the melting point of said metal, and a slow-rate water leachability releasing, by dissolution of said glass, corrosion-inhibiting amounts of substances to adjacent metal surfaces.

2. A manufacture of improved corrosion resistance according to claim 1 wherein said ground glass is a member of the group of glass classes consisting of the silicates and the phosphates.

3. A manufacture of improved corrosion resistance according to claim 1 wherein said glass constitutes between about 5 volume percent and 25 volume percent of said sintered metal-glass composite.

4. A manufacture of improved corrosion resistance according to claim 1 wherein said ground glass is charged with a colorant having a fastness surviving the maximum temperature of said glass in its softened state.

5. A manufacture of improved corrosion resistance according to claim 1 wherein said ground glass has a water leachability rate of about 50 p.p.m. to about 10,000 p.p.m. of said corrosion-inhibiting amounts of substances when mixed in the ratio of 1 part glass to 2 parts distilled water and agitated gently for 4 hours at room temperatures.

6. A manufacture of improved corrosion resistance according to claim 1 wherein said glass is charged with a corrosion inhibitor added to said glass as vehicle, said corrosion inhibitor releasing by ionization corrosion-inhibiting amounts of substances concurrently with those formed by said dissolution of said glass.

7. A manufacture of improved corrosion resistance comprising a sintered metal-glass composite wherein adjacent sites of said glass within said metal are separated at spacings not exceeding about 0.1 mm. made up of an intimate mixture of powdered metal and a ground glass having a softening point within about ±100° C. of the sintering temperature of said metal, but below the melting point of said metal, and a slow-rate water leachability releasing, by dissolution of said glass, corrosion-inhibiting amounts of substances to adjacent metal surface, said ground glass being charged with a metal-oxygen compound having, in itself, corrosion-inhibiting properties.

8. A manufacture of improved corrosion resistance according to claim 7 wherein said metal-oxygen compound consists of at least one of the group made up of tungstates, chromates, molybdates, borates and phosphates.

9. A manufacture of improved corrosion resistance according to claim 7 wherein said ground glass is additionally charged with a colorant having a fastness surviving the maximum temperature of said glass in its softened state.

References Cited by the Examiner

UNITED STATES PATENTS 3,047,383   7/62   Slayter _____ 29—182.5

CARL. D. QUARFORTH, *Primary Examiner.*

REUBEN EPSTEIN, *Examiner.*

UNITED STATES PATENT OFFICE
CERTIFICATE OF CORRECTION

Patent No. 3,205,566                      September 14, 1965

Ernest J. Breton

It is hereby certified that error appears in the above numbered patent requiring correction and that the said Letters Patent should read as corrected below.

Column 1, line 15, for "weather" read -- weathering --; line 29, for "subtsances" read -- substances --; line 36, for "and" read -- of --; line 37, after "respective" insert a hyphen; column 3, line 4, for "(20° C.)" read -- (25° C.) --; line 20, after "nitrates" insert a comma; line 32, after "chromates" insert a comma; line 43, for "lechability" read -- leachability --; line 45, for "mechinability" read -- machinability --; line 55, for "sinister" read -- sinter --; line 56, for "appreciable" read -- appreciably --; line 69, for "if" read -- of --; column 5, line 28, for "Chromate" read -- "Chromate --; Example 1, second column, line seven thereof, for "0.16" read -- 0.06 --; column 6, line 28, for "solubility." read -- solubility: --; line 44, for '"Alcad,"' read -- "Alclad," --; column 7, line 37, for "1.0" read -- 1.9 --; line 45, for "producet" read -- product --; line 61, for "difinite" read -- definite --; column 8, line 14, for "spronge" read -- sponge --; line 35, after "chamber" insert -- was --; column 9, lines 30 and 31, for "subpected" read -- subjected --.

Signed and sealed this 12th day of April 1966.

(SEAL)
Attest:

ERNEST W. SWIDER                            EDWARD J. BRENNER
Attesting Officer                         Commissioner of Patents